United States Patent
Debnath et al.

(10) Patent No.: US 12,457,269 B2
(45) Date of Patent: Oct. 28, 2025

(54) SYSTEMS AND METHODS FOR EXECUTING A COMMAND LINE INTERFACE COMMAND ON REMOTE DEVICES FROM A CENTRAL LOCATION

(71) Applicant: Sophos Limited, Abingdon (GB)

(72) Inventors: Anirban Debnath, Bengaluru (IN); Pramit Dey, Kolkata (IN); Dhiraj Jha, Bangalore (IN); Amulya Kumar Mishra, Bangalore (IN)

(73) Assignee: Sophos Limited, Abingdon (GB)

( * ) Notice: Subject to any disclaimer, the term of this patent is extended or adjusted under 35 U.S.C. 154(b) by 39 days.

(21) Appl. No.: 18/169,475

(22) Filed: Feb. 15, 2023

(65) Prior Publication Data
US 2024/0283849 A1    Aug. 22, 2024

(51) Int. Cl.
*H04L 67/55* (2022.01)
*G06F 9/448* (2018.01)

(52) U.S. Cl.
CPC ............. *H04L 67/55* (2022.05); *G06F 9/448* (2018.02)

(58) Field of Classification Search
CPC ................................ H04L 67/55; G06F 9/448
See application file for complete search history.

(56) References Cited

U.S. PATENT DOCUMENTS

| | | |
|---|---|---|
| 7,496,950 B2 | 2/2009 | Carley |
| 9,565,548 B2 | 2/2017 | Desai et al. |
| 9,973,451 B2 * | 5/2018 | Mehta ................. H04L 41/5041 |
| 11,349,714 B1 | 5/2022 | Phadte et al. |
| 2003/0135508 A1 | 7/2003 | Chorafakis et al. |
| 2007/0233826 A1 | 10/2007 | Tindal et al. |
| 2015/0019199 A1 | 1/2015 | Andrews et al. |
| 2016/0287189 A1 * | 10/2016 | Modai ................. A61B 5/0022 |
| 2018/0006878 A1 * | 1/2018 | Raman ................ G06F 11/3051 |
| 2018/0270290 A1 | 9/2018 | Sinha et al. |
| 2021/0281533 A1 * | 9/2021 | Schumacher ......... H04L 51/224 |

(Continued)

OTHER PUBLICATIONS

[Author Unknown] "AWS Systems Manager User Guide" Amazon Web Services, Inc. (2022); 1681 pages.

(Continued)

*Primary Examiner* — Emmanuel L Moise
*Assistant Examiner* — Xiang Yu
(74) *Attorney, Agent, or Firm* — COOLEY LLP

(57) ABSTRACT

In an embodiment, an apparatus includes one or more processors configured to receive at least one command line interface command, generate a push notification associated with the at least one command line interface command, send the push notification to at least one managed device, responsive to the at least one managed device receiving the push notification, receive a pull request from the at least one managed device, responsive to receiving the pull request, send the at least one command line interface command to a device-specific adaptor of the at least one managed device such that the device-specific adaptor converts the at least one command line interface command to a device-specific command associated with the at least one managed device, and receive an execution status from the at least one managed device in response to the device-specific command being executed by the at least one managed device.

26 Claims, 11 Drawing Sheets

(56) References Cited

U.S. PATENT DOCUMENTS

2022/0247686 A1* 8/2022 Rajagopalan ........... H04L 67/51

OTHER PUBLICATIONS

Patel, S., et al., "Using AWS Systems Manager in Hybrid Cloud Environments", AWS Architecture Blog (Jun. 20, 2021); 8 pages.
Office Action and Search Report for United Kingdom Application No. GB2402099.2, by Sophos Limited, mailed Jan. 9, 2025, 10 pages.

* cited by examiner

```
(1)console> show license_status
License status : Appliance is activated & License Synced

##############################################
(2)console> show advanced-firewall
        Strict Policy                    : on
        FtpBounce Prevention             : control
        Tcp Conn. Establishment Idle Timeout : 10800
        UDP Timeout                      : 30
        UDP Timeout Stream               : 60
        Fragmented Traffic Policy        : allow
        Midstream Connection Pickup      : off
        TCP Seq Checking                 : on
        TCP Window Scaling               : on
        TCP Appropriate Byte Count       : off
        TCP Selective Acknowledgements   : on
        TCP Forward RTO-Recovery(F-RTO)  : off
        TCP TIMESTAMPS                   : off
        Strict ICMP Tracking             : off
        ICMP Error Message               : allow
        Caching for route lookups        : on
        IPv6 Unknown Extension Header    : deny Bypass Stateful Firewall
        ------------------------
           Source            Genmask           Destination       Genmask NAT policy for system originated traffic
        ----------------------------------------
           Destination Network   Destination Netmask   Interface   SNAT IP

##############################################
(3)console> system diagnostics show disk
Partition       Utilization(%)
##############################################
configuration   13%
content         10%
report          7%

##############################################
(4)console> system diagnostics show memory
MemTotal:        4037760 kB
MemFree:          349688 kB
MemAvailable:    1571668 kB
Buffers:          235304 kB
Cached:          1227488 kB
SwapCached:            0 kB
Active:          2671988 kB
Inactive:         676436 kB
Active(anon):    1913388 kB
Inactive(anon):    67020 kB
Active(file):     758600 kB
Inactive(file):   609416 kB
Unevictable:           0 kB
Mlocked:               0 kB
SwapTotal:       4032336 kB
SwapFree:        4032336 kB
Dirty:              1768 kB
Writeback:             0 kB
AnonPages:       1885680 kB
Mapped:           177824 kB
Shmem:             94732 kB
Slab:             138608 kB
SReclaimable:     101624 kB
SUnreclaim:        36984 kB
KernelStack:       11360 kB
PageTables:        25196 kB
NFS_Unstable:          0 kB
Bounce:                0 kB
WritebackTmp:          0 kB
CommitLimit:     6051216 kB
Committed_AS:    6426996 kB
VmallocTotal:   34359738367 kB
VmallocUsed:           0 kB
VmallocChunk:          0 kB
DirectMap4k:      157568 kB
DirectMap2M:     4036608 kB
DirectMap1G:     2097152 kB

##############################################
(5)system diagnostics show uptime
00:31:38 up 2 days, 23:39,  load average: 0.07, 0.08, 0.08
```

FIG. 8

```
(1)CS110-48# show dhcp server

DHCP server 1:  6.6.7.7

################################################
(2)CS110-48# show users

Line          User        Peer-Address
  ssh         admin       10.194.99.33

################################################
(3)CS110-48# show ssh-configurations Ssh Status        : Enabled Listening Port    : 22
Cipher Algorithm  : 3DES-CBC, AES128-CBC, AES256-CBC
Authentication    : HMAC-SHA1, HMAC-MD5

################################################
(4)CS110-48# show interfaces Gigabitethernet 0/1

Gi0/1 up, line protocol is up (connected)
Bridge Port Type: Customer Bridge Port Interface SubType: gigabitEthernet
Interface Alias: Slot0/1

Hardware Address is C8:4F:86:30:04:25
MTU 1522 bytes, Full duplex, 1 Gbps,  Auto-Negotiation
MDL Block Prevention enabled.
CPU Controlled learning disabled.
Auto-MDIX on
Input flow-control is off,output flow-control is off Link Up/Down Trap is enabled Reception Counters
    Octets              : 1044433971
    HC-Octets           : 9634367563
    Unicast Packets     : 5431434
    Discarded Packets   : 0
    Error Packets       : 0
    Unknown Protocol    : 0

Transmission Counters
    Octets              : 2336655768
    HC-Octets           : 2336655768
    Unicast Packets     : 12893884
    Discarded Packets   : 0
    Error Packets       : 0

################################################
(5)CS110-48# show bootvar

Partition 1 Information:
  CheckDate: 2022/8/24 16:34
  CheckInfo: 0xe9d0cc83
  CheckVer : IMG-01.2.1097

Partition 2 Information:
  CheckDate: 2022/8/4 18:32
  CheckInfo: 0xe3616ca6
  CheckVer : IMG-01.2.1091
```

FIG. 9

SYSTEMS AND METHODS FOR EXECUTING A COMMAND LINE INTERFACE COMMAND ON REMOTE DEVICES FROM A CENTRAL LOCATION

BACKGROUND

In one or more implementations, systems and method disclosed herein execute command line interface commands on remote devices from a central location.

In some known systems, executing command line interface ("CLI") commands on a group of devices requires a user (e.g., administrator, manager, etc.) to execute the command line interface command on each device. While individually executing CLI commands on each device from a group of devices can be reasonable for a relatively small number of devices, executing CLI commands indubitably becomes cumbersome and resource intensive when the group of devices is relatively large. Furthermore, some known processes do not provide information related to the entire or a subset of the group of devices and only provide information related to individual devices. Thus, there is a need for administrators to be able to execute CLI commands on a group of devices and receive output related to the individual devices as well as the group as a whole.

SUMMARY

In some embodiments, an apparatus includes one or more memories and one or more processors operatively coupled to the one or more memories. The one or more processors are configured to receive at least one command line interface ("CLI") command, generate a push notification associated with the at least one CLI command, send the push notification to at least one managed device, and responsive to the at least one managed device receiving the push notification, receive a pull request from the at least one managed device. The one or more processors are further configured to, responsive to receiving the pull request, send the at least one command line interface command to a device-specific adaptor of the at least one managed device such that the device-specific adaptor converts the at least one command line interface command to a device-specific command associated with the at least one managed device, and receive an execution status from the at least one managed device in response to the device-specific command being executed by the at least one managed device.

In some embodiments, a non-transitory processor-readable medium stores code representing instructions to be executed by one or more processors. The instructions include code to cause the one or more processors to receive at least one command line interface command and send a notification to a plurality of managed devices. The notification can be associated with the at least one command line interface command. The instructions further include code to cause the one or more processors to receive, in response to the notification, a first pull request from a first managed device from the plurality of managed devices. The first pull request is associated with the at least one command line interface command. The instructions further include code to cause the one or more processors to send the at least one command line interface command to a device-specific adaptor of the first managed device such that the device-specific adaptor of the first managed device converts the at least one command line interface command to a first device-specific command, and receive, in response to the notification, a second pull request from a second managed device from the plurality of devices. The second pull request is associated with the at least one command line interface command. The instructions further include code to cause the one or more processors to send the at least one command line interface command to a device-specific adaptor of the second managed device such that the device-specific adaptor of the second managed device converts the at least one command line interface command to a second device-specific command, and receive an execution status from at least one of the first managed device or the second managed device in response to the first device-specific command being executed by the first managed device or the second device-specific command being executed by the second managed device.

In some embodiments, an apparatus includes one or more memories and one or more processors operatively coupled to the one or more memories. The one or more processors are configured to receive a notification regarding at least one command line interface command and send a pull request. The pull request includes a request to download the at least one command line interface command. The one or more processors are configured to receive the at least one command line interface command, convert the at least one command line interface command to a device-specific command, and execute the device-specific command.

BRIEF DESCRIPTION OF THE DRAWINGS

FIG. 8 shows an example of results of an executed command line interface command, according to an embodiment.

FIG. 9 shows another example of results of an executed command line interface command, according to an embodiment.

DETAILED DESCRIPTION

In some implementations, a user (e.g., administrator, manager, etc.) generates a CLI command within a CLI configured for at least one managed device. A push notification is generated, based on the CLI command, and sent to at least one managed device. Upon receiving the push notification, the at least one managed device sends a pull request associated with the CLI command. The CLI command is then sent to a device-specific adaptor of the at least one managed device. The device-specific adaptor converts the at least one CLI command to a device-specific command associated with the at least one managed device. The at least one managed device then sends an execution status associated with the device-specific command being executed by the at least one managed device. In some implementations, the CLI command can include a configuration change, a request for system information, a status check, an operation to be carried out on the device, and/or the like.

Figure 1:
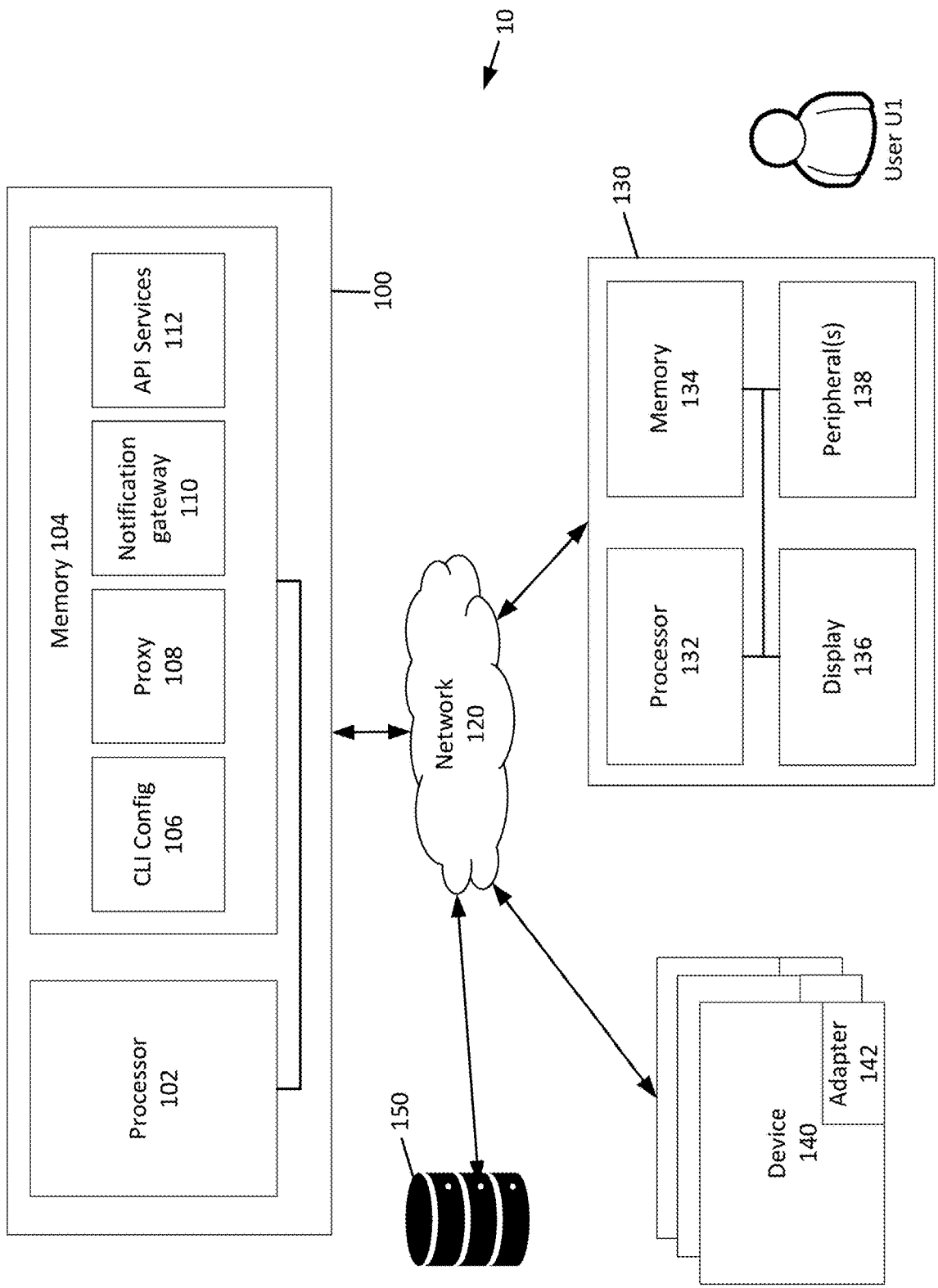
FIG. 1 shows a block diagram of a system for executing a command line interface (CLI) command, according to an embodiment.

FIG. 1 shows a block diagram of a system 10 for executing command line interface (CLI) commands on a group of managed devices. The system 10 can include a command executing system 100, a user compute device 130, devices 140, and a database 150, each operatively coupled to one another via a network 120.

The network 120 facilitates communication between the components of the system 10. The network 120 can be any suitable communication network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In some instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats, (e.g., Representational State Transfer (REST), JavaScript Object Notation (JSON), Extensible Markup Language (XML), Simple Object Access Protocol (SOAP), and/or Java Message Service (JMS). The communications sent via the network 120 can be encrypted or unencrypted. In some instances, the network 120 can include multiple networks or subnetworks operatively coupled to one another by, for example, network bridges, routers, switches, gateways and/or the like (not shown).

The user compute device 130 is a device configured to input CLI commands, manage remote devices, and/or display results from executed CLI commands. The user compute device 130 can include a processor 132, memory 134, display 136, and peripheral(s) 138, each operatively coupled to one another (e.g., via a system bus). In some implementations, the user compute device 130 is associated with (e.g., owned by, accessible by, operated by, etc.) a user U1. The user U1 can be any type of user, such as, for example, an administrator, a manager, and the like.

The processor 132 of the user compute device 130 can be, for example, a hardware based integrated circuit (IC), or any other suitable processing device configured to run and/or execute a set of instructions or code. For example, the processor 132 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 can be operatively coupled to the memory 134 through a system bus (for example, address bus, data bus and/or control bus).

The memory 134 of the user compute device 134 can be, for example, a random-access memory (RAM), a memory buffer, a hard drive, a read-only memory (ROM), an erasable programmable read-only memory (EPROM), and/or the like. In some instances, the memory 134 can store, for example, one or more software programs and/or code that can include instructions to cause the processor 132 to perform one or more processes, functions, and/or the like. In some implementations, the memory 134 can include extendable storage units that can be added and used incrementally. In some implementations, the memory 134 can be a portable memory (e.g., a flash drive, a portable hard disk, and/or the like) that can be operatively coupled to the processor 132. In some instances, the memory 134 can be remotely operatively coupled with a compute device (not shown). For example, a remote database device can serve as a memory and be operatively coupled to the compute device.

The peripheral(s) 138 can include any type of peripheral, such as an input device, an output device, a mouse, keyboard, microphone, touch screen, speaker, scanner, headset, printer, camera, and/or the like. In some instances, the user U1 can use the peripheral(s) 138 to indicate a desired CLI command. For example, the user U1 can type the command using a keyboard included in peripheral(s) 138 to indicate the command and/or select the command using a mouse included in peripherals(s) 138 to indicate the command.

The display 136 can be any type of display, such as a Cathode Ray tube (CRT) display, Liquid Crystal Display (LCD), Light Emitting Diode (LED) display, Organic Light Emitting Diode (OLED) display, and/or the like. The display 136 can be used for visually displaying information (e.g., command line, etc.) to user U1. For example, display 136 can display a result of executing a CLI command. Example outputs that can be displayed by the display 136 are shown at FIG. 7C, FIG. 8 and FIG. 9.

The devices 140 are remote devices (e.g., devices external of the command executing system 100). The devices 140 can be devices configured to each accomplish their own tasks independent of the command executing system 100 and of each other. Each of the devices 140 can be any remote device managed by a user via an admin device (e.g., such as the user compute device 130). In some implementations, the devices 140 include network devices. In some implementations, the devices 140 include, for example, at least one of a network access point, a firewall, a switching device, a Wi-Fi access point, a router, a server, a device capable of executing a CLI console, a device able to be managed by a command executing system (e.g., command executing system 100) and/or the like. The system 10 can include any number of devices of any type.

Each of the devices 140 includes and/or executes an adapter 142 (e.g., stored in a memory of and executed by a processor of each of devices 140). In some implementations, the adapters 142 are specific to the associated device 140 and/or a type of the associated device 140. In some implementations, an adapter 142 can be used for a number of devices. In some implementations, the adapter 142 is used for a number of devices of the same type. The adapter 142 can allow for the devices 140 to receive the CLI commands from a central location. The adapter 142 can be configured to receive a CLI command and convert (e.g., format) the CLI command to a device-specific command (e.g., formatted CLI command). In some implementations, the adapter 142 is configured to convert the CLI command to a command associated with a certain device-type. For example, the adapter 142 can be configured to convert CLI commands to network device commands. As another example, the adapter 142 can be configured to convert CLI commands to firewall-specific commands. In some implementations, the adapters 142 parse and execute the CLI commands based on device-type. For example, if the CLI command is in the form of a JavaScript Object Notation (JSON) payload, the adapter parses the JSON payload to find and/or identify the executable command. As another example, if the device 140 is a firewall, the JSON payload can be parsed to find and/or identify the value of "opcode" that is a CLI string (e.g., "system diagnostic show memory"). The value can then be sent to a control program as a parameter. In some implementations, the control program can be configured to receive a command from a shell and write a response to the shell. The adapter 142 can be configured to be part of the devices 140 (e.g., executed on the devices 140) or can be separate from the device 140 (e.g., executed on a separate device operatively connected to the devices 140 by, for example, network 120). In some implementations, the adapter 142 sends the converted CLI command to the device 140.

The database 150 stores information related to the system 10 and the processes described herein. For example, the database 150 can store the CLI commands, execution status, time to complete a task and/or execute a command, and similar information. The database 150 can be any device or service configured to store signals, information, and/or data (e.g., hard-drive, server, cloud storage service, etc.). The database 150 can receive and store signals, information and/or data from the other components (e.g., the devices 140, the user compute device 130 and the command executing system 100) of the system 10. The database 150 can include a local storage system associated with the command executing system 100, such as a server, a hard-drive, or the like or a cloud-based storage system. In some implementations, the database 150 can include a combination of local storage systems and cloud-based storage systems.

The command executing system 100 is configured to receive (or generate) and facilitate execution of CLI commands on the devices 140. The command executing system 100 can include a processor 102 and a memory 104, each operatively coupled to one another (e.g., via a system bus). The memory 104 can include a command line interface (CLI) config 106, a proxy 108, a notification gateway 110, and application programming interface (API) services 112. In some implementations, the user compute device 130 is associated with (e.g., owned by, accessible by, operated by, etc.) an organization, and the command executing system 100 is associated with (e.g., owned by, accessible by, operated by, etc.) the same organization. In some implementations, the user compute device 130 is associated with (e.g., owned by, accessible by, operated by, etc.) a first organization, and the command executing system 100 is associated with (e.g., owned by, accessible by, operated by, etc.) a second organization different than the first organization.

The memory 104 of the of the command executing system 100 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like. In some implementations, the memory 104 can include extendable storage units that can be added and used incrementally. In some implementations, the memory 104 can be a portable memory (for example, a flash drive, a portable hard disk, and/or the like) that can be operatively coupled to the processor 102. In some instances, the memory 104 can be remotely operatively coupled with a compute device (not shown). For example, a remote database device can serve as a memory and be operatively coupled to the compute device.

The command executing system 100 can receive a CLI command from the user U1 (e.g., via a user providing the CLI command to the user compute device 130 and the user device 130 sending the CLI command to the command executing system 100 via the network 120). In some implementations, the command executing system 100 generates CLI commands. The CLI command can include commands requesting device 140 information such as status, licensing information, diagnostic information, and/or the like. In some implementations, the CLI command can include commands that result in the devices 140 returning information. In some implementations, the CLI commands can include commands that can be executed by the devices 140 to complete operations (e.g., updates, configuration changes, etc.).

The API services 112 are services configured to facilitate communication and interaction of the command execution system 100. The CLI command is received by the command executing system 100 via the API services 112. In some implementations, the API services 112 can be a software interface configured to accept the CLI command and prepare the command for processing by the other components of the command executing system 100. In some implementations, the API services 112 can normalize the CLI command to a command readable by other components of the command executing system 100. After the API services 112 configures the CLI for processing by the other components of the command executing system 100, the CLI command is sent to the CLI config 106.

The CLI config 106 is configured to manage the distribution of the CLI command to the other components of the system 10 (e.g., distribution to database 150 and devices 140). The CLI config 106 is configured to store the CLI command in the database 150 and directs the execution of the CLI command to the devices 140. The CLI config 106 can determine which device(s) 140 the CLI command is intended to reach. The CLI config 106 can determine the destination device(s) 140 based on the CLI command itself or based on additional information received from the user compute device 130. After the CLI config 106 determines the destination device(s) 140, the CLI config 106 sends a signal to the notification gateway 110.

The notification gateway 110 is configured to notify the devices 140 of an available CLI command. In some implementations, the notification gateway and the device 140 send information via a WebSocket connection protocol. The notification gateway 110 sends a push notification to the adapter (s) 142 of the destination device(s) 140. The push notification can include information related to the CLI command or can include information generally indicating a CLI command. In some implementations, the push notification is sent directly to the device(s) 140. Once the device(s) 140 receives the push notification from the notification gateway 110, the device(s) 140 sends a pull request to the proxy 108. In some implementations, the adapters 142 can send the pull request to the proxy. In some implementations, the pull request is sent to the CLI config 106.

The proxy 108 is configured to route information from and to the CLI config 106. In some implementations, the proxy 108 includes a queuing system for controlling the traffic into/out of the CLI config 106. After receiving the pull request, the proxy 108 routes the pull request back to the CLI config 106. Including a separate channel for push notifications (e.g., the notification gateway) and a channel for the pull requests (e.g., the proxy 108) allows for the system to avoid bottlenecks. In some implementations, the proxy 108 receives information from the CLI config 106 and routes the information to the device 140. In some implementations, the proxy 108 can be used as an overflow channel for the notification gateway 110. For example, if the proxy 108 is at or above a capacity threshold, the notification gateway 110 may be used to route information intended to be routed via the proxy 108. For example, if the proxy 108 is at or above a capacity threshold, the notification gateway 110 may be used to route information intended to be routed via the proxy 108.

Once the CLI config 106 receives the pull request from the proxy 108, the CLI config 106 sends the CLI command to the adapter 142. In some implementations, the CLI config 106 sends the CLI command directly to the adapter 142. In some implementations, the CLI config 106 sends the CLI command to the adapter 142 via the proxy 108. After receiving the CLI command, the adapter 142 converts the CLI command into a device-specific command capable of being executed by the device 140. The device 140 then executes the device-specific command and generates an execution status including information regarding the execution of the device-specific command. The execution status is sent to the user compute device 130 via the CLI config 106. The execution status can indicate whether the CLI command was executed and/or can include information regarding the execution of the CLI command. In some implementations, the execution status can be routed via the notification gateway 110 or the proxy 108.

Although FIG. 1 is described in reference to one CLI command, multiple CLI commands can be processed simultaneously, in parallel and/or by one or more devices. For example, a first CLI command can be associated with a first device or group of devices and a second CLI command can be associated with a second device or group of devices different from the first device. Although the CLI config 106, the proxy 108, the notification gateway 110, and the API services 112 are described to be on a first device and the processor 132 and the memory 134 is described to be on a second device, in some implementations, the components of the system 10 can be distributed on any number of devices interconnected via the network 120.

Figure 2:
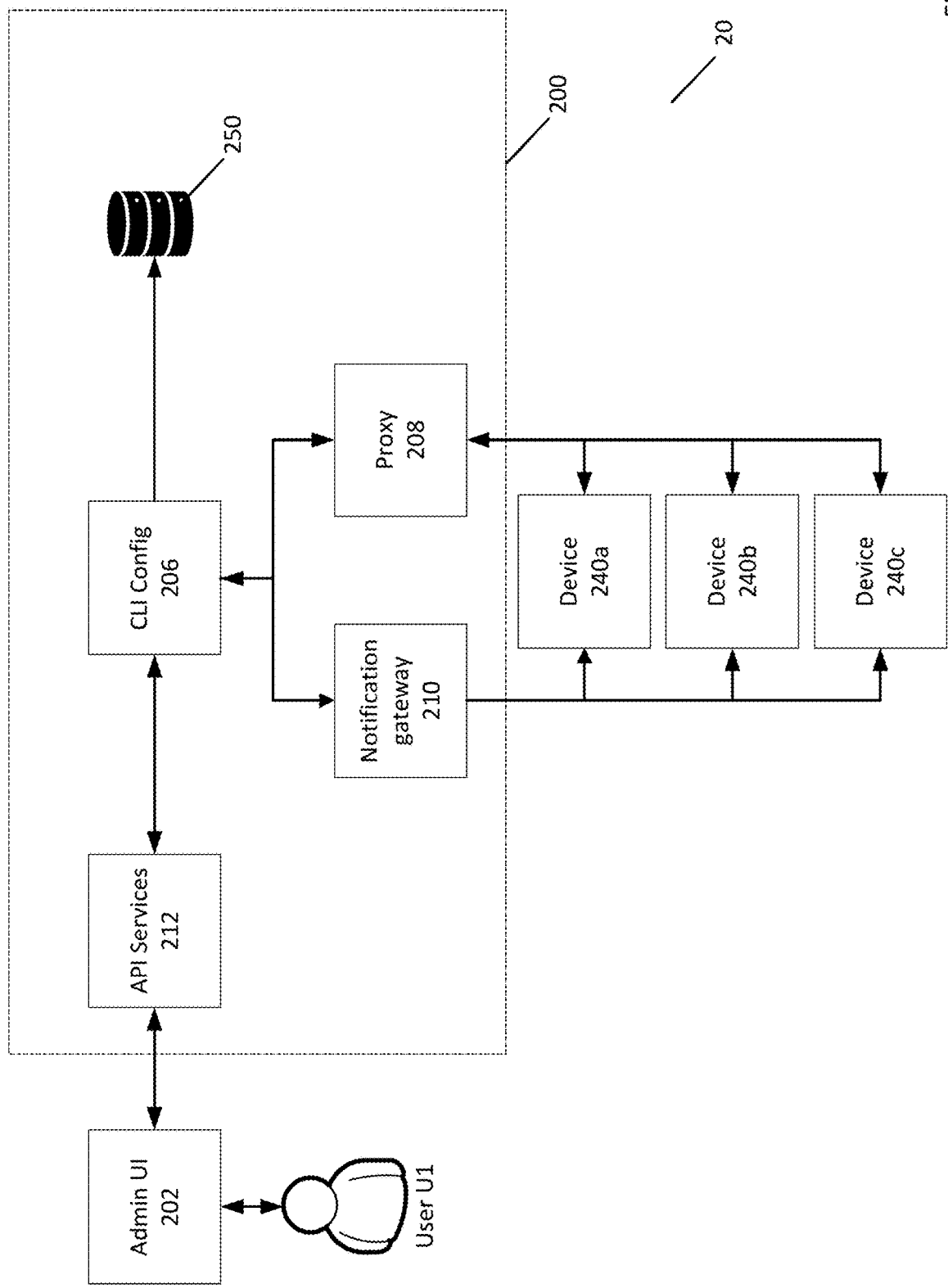
FIG. 2 shows a workflow for executing a CLI command on a group of remote devices, according to an embodiment.

FIG. 2 shows a workflow 20 for executing a CLI command on a group of remote devices, according to an embodiment. The workflow 20 can be stored on one or more memories and/or executed on one or more processors. For example, the processes described in reference to FIG. 2 can be executed by the one or more processors while the instructions for can be stored on the one or more memories. The workflow 20 includes an admin user interface (U1) 202 (e.g., executed by a user compute device functionally and/or structurally similar to user compute device 130), a command executing environment 200 including API services 212 (e.g., functionally and/or structurally similar to the API services 112 of FIG. 1), a CLI config 206 (e.g., functionally and/or structurally similar to the CLI config 106 of FIG. 1), a database 250 (e.g., functionally and/or structurally similar to the database 150 of FIG. 1), a notification gateway 210 (e.g., functionally and/or structurally similar to the notification gateway 110 of FIG. 1), and a proxy 208 (e.g., functionally and/or structurally similar to the proxy 108 of FIG. 1), and devices 240a, 240b, and 240c (functionally and/or structurally similar to devices 140 of FIG. 1). The embodiment of FIG. 2 includes three devices, but the workflow 20 can be scaled to any number of devices. In some implementations, additional devices are included. In some implementations, each of the additional devices includes an associated adapter. In some implementations, the components of the command executing environment 200 can be executed on processors of any number of devices. For example, the API services 212 and the CLI config 206 can be on a first device, the database 250 can be on a second device, and the notification gateway 210 and the proxy 208 can be on a third device.

The admin U1 202 is a user interface that can receive and/or display inputs from a user U1. In some implementations, the admin U1 202 is and/or can be executed on a user compute device (e.g., functionally and/or structurally similar to the user compute device 130 of FIG. 1). In some implementations, the admin U1 202 is one or more components of a user compute device. For example, the admin U1 202 can include a display (e.g., structurally and/or functionally similar to the display 136 of FIG. 1) for displaying inputs and results and/or peripheral(s) (e.g., structurally and/or functionally similar to the peripherals 138 of FIG. 1) for inputting of CLI commands. In some implementations, the admin U1 202 can display CLI command execution status and other information received from the other components within the workflow 20. In some implementations, the admin U1 202 is coupled to an external processing device (e.g., cloud computing, processor, user compute device, etc.). The admin U1 202 receives at least one CLI command from the user U1 and directs the at least one CLI command to the command executing environment 200.

The command executing environment 200 receives, processes, and distributes the at least one CLI command. In some implementations, the command executing environment 200 includes a command executing system (e.g., the command executing system 100 of FIG. 1). The API services 212 receive the at least one CLI command and prepare the at least one CLI command for processing and/or execution. In some implementations, the API services 212 can define a command package including the at least one CLI command and any associated information, such as an identifier of the destination device 140, user U1 identification, and/or the like. In some implementations, the command package can include multiple CLI commands. In some implementations, the API services 212 receive inputs from the admin U1 202 that are associated with CLI commands and the API services 212 convert the inputs into associated CLI commands. For example, the inputs can include the user U1 making selections on an interface associated with different CLI commands. In some implementations, the API services 212 can generate notifications and/or messages regarding the status and/or progress of CLI command execution based on signals and/or information received from the CLI config 206 and/or the devices (204a, 204b, and 204c). The API services 212 can send the notifications and/or messages back to the admin U1 202 for communication of CLI command execution status to the user U1.

After the API services 212 have configured the CLI command for processing, the API services send the CLI command to the CLI config 206. The CLI config 206 manages the CLI command execution process including notifying of the CLI command, receiving pull requests for the CLI command, and pushing the CLI command. In some implementations, the CLI config 206 can be configured to store information regarding the CLI command execution process in the database 250. For example, the CLI config 206 can store the CLI command, the identification of the user U1, the time of entry, the status of the CLI command execution, results of the CLI command execution, processing time, and/or the like. In some implementations, the CLI config 206 determines the device (240a, 240b, and 240c) on which the CLI command is to be executed. The determination can include determining a device (240a, 240b, and 240c) from a device ID.

After receiving the CLI command, the CLI config 206 sends a signal to the notification gateway 210. The notification gateway 210 sends notification messages to the devices (240a, 240b, and 240c) indicating a CLI command is available for execution. In some implementations, the notification gateway 210 can determine to which device (240a, 240b, and 240c) to send a notification message based on which device (240a, 240b, and 240c) is associated with the CLI command. The notification message can include an indication of an available CLI command, the size of the CLI command, and/or the like. In some implementations, the notification message may include a size constraint so that the notification message may reduce the amount of network traffic and/or the processing power used by the devices (240a, 240b, and 240c) to process the notification message and/or store the notification message for further processing. For example, the devices (240a, 240b, and 240c) can store the notification message until processing power is available to process the notification message. In some implementations, the notification message can include an urgency status. The urgency status can indicate to the device, the urgency of the CLI command execution.

The devices (240a, 240b, and 240c) receive the notification message from the notification gateway 210. In some implementations, the notification message is received by an adapter (e.g., functionally and/or structurally similar to the adapters 142 of FIG. 1) included the in the device (240a, 240b, and 240c). In some implementations, the adapter can convert the notification message to a format readable by the device (240a, 240b, and 240c). The devices (240a, 240b, and 240c), based on the notification message, can generate a pull request requesting to download the CLI command. In some implementations, the devices (240a, 240b, and 240c) can send one pull request to request multiple CLI commands. In some implementations, the devices (240a, 240b, and 240c) can send the pull request when a processing load of the devices (240a, 240b, and 240c) is below a predetermined threshold (e.g., to obtain the CLI request when the device (240a, 240b, and 240c) has capacity to execute the CLI command without degrading performance of other operations). The predetermined threshold can be associated with the amount of processing power needed to process and/or execute the CLI command associated with pull request. The devices (240a, 240b, and 240c) can send the pull request to the proxy 208. In some implementations, the adapter can store the address of the proxy. In some implementations, the devices (240a, 240b, and 240c) send the pull request based on the urgency status indicated. For example, if the urgency status indicates a high urgency, the devices (240a, 240b, 240c) can send a pull request as soon as the notification message is processed. If the urgency status indicates a low urgency, the devices (240a, 240b, and 240c) can move the pull request to a lower point in the queue, can wait to pull the CLI request until a load at the device is below a predetermined threshold and/or can wait until a sufficient number of CLI requests are ready to be pulled and pull such CLI requests in a batch. In some implementations, the devices (240a, 240b, and 240c) can send pull requests on a periodic and/or on-demand basis.

The proxy 208 is configured to receive the pull request from one or more of the devices (240a, 240b, and 240c) and route the pull request back to the CLI config 206. The CLI config receives the pull request and sends the CLI command to the proxy 208. In some implementations, the CLI config 206 can generate and send a CLI command package that includes multiple CLI commands that are associated with one or more pull requests. In some implementations, the CLI config 206 can look up (e.g., in a database) a device (240a, 240b, and 240c) by a device ID and in response to identifying an identified device, send the CLI commands associated with the identified device to the identified device. The proxy 208 receives the CLI command from the CLI config 206 and routes the CLI command to the device (240a, 240b, and 240c) to which the CLI command is addressed and/or associated. In some implementations, when multiple CLI commands are included in a pull request, the CLI config 206 can store and provide the CLI commands in an order of receipt such that the device executes the CLI commands in the correct order. In some implementations, the proxy 208 can send the CLI command to more than one associated device (240a, 240b, and 240c).

The associated devices (240a, 240b, and 240c) receive the CLI command. In some implementations, the devices (240a, 240b, and 240c) can add the CLI command to a processing queue. In some implementations, the devices (240a, 240b, and 240c) receive the CLI command via the adapter. The adapter receives the CLI command and converts the CLI command into a format that is executable by the device (240a, 240b, and 240c). The device (240a, 240b, and 240c) executes the CLI command (or the converted CLI command). In some implementations, the devices (240a, 240b, and 240c) can continuously, periodically, or sporadically, send a progress status to the CLI config 206, which can route the progress status to the admin U1 202 via the API services 212. In some implementations, the progress status can be stored in the database 250 permanently or temporarily. In some implementations, the user U1 can request, via the admin U1 202, the progress status. Execution of the CLI command (or the converted CLI command) can generate a results package. The results package can include an execution status (e.g., failed, or successful), results of the execution, execution time, information requested by the CLI command (e.g., operational status), etc.

The devices (240a, 240b, and 240c) can send the results package to the CLI config 206 via the proxy 208. In some implementations, the results package can be sent to the CLI config 206 via the notification gateway 210. The CLI config 206 can store the received results package in the database 250. The CLI config 206 can also send the results package to the API services 212. The API services 212 can convert the results package to a format that can be received by the admin U1 202. The admin U1 202 receives the results package and can display the results package to the user U1. In some implementations, the results package is stored in the database 250 and can be accessed by the user U1 inputting a request into the admin U1 202, which then generates an access request that is routed to and executed by the CLI config 206.

Figure 3:
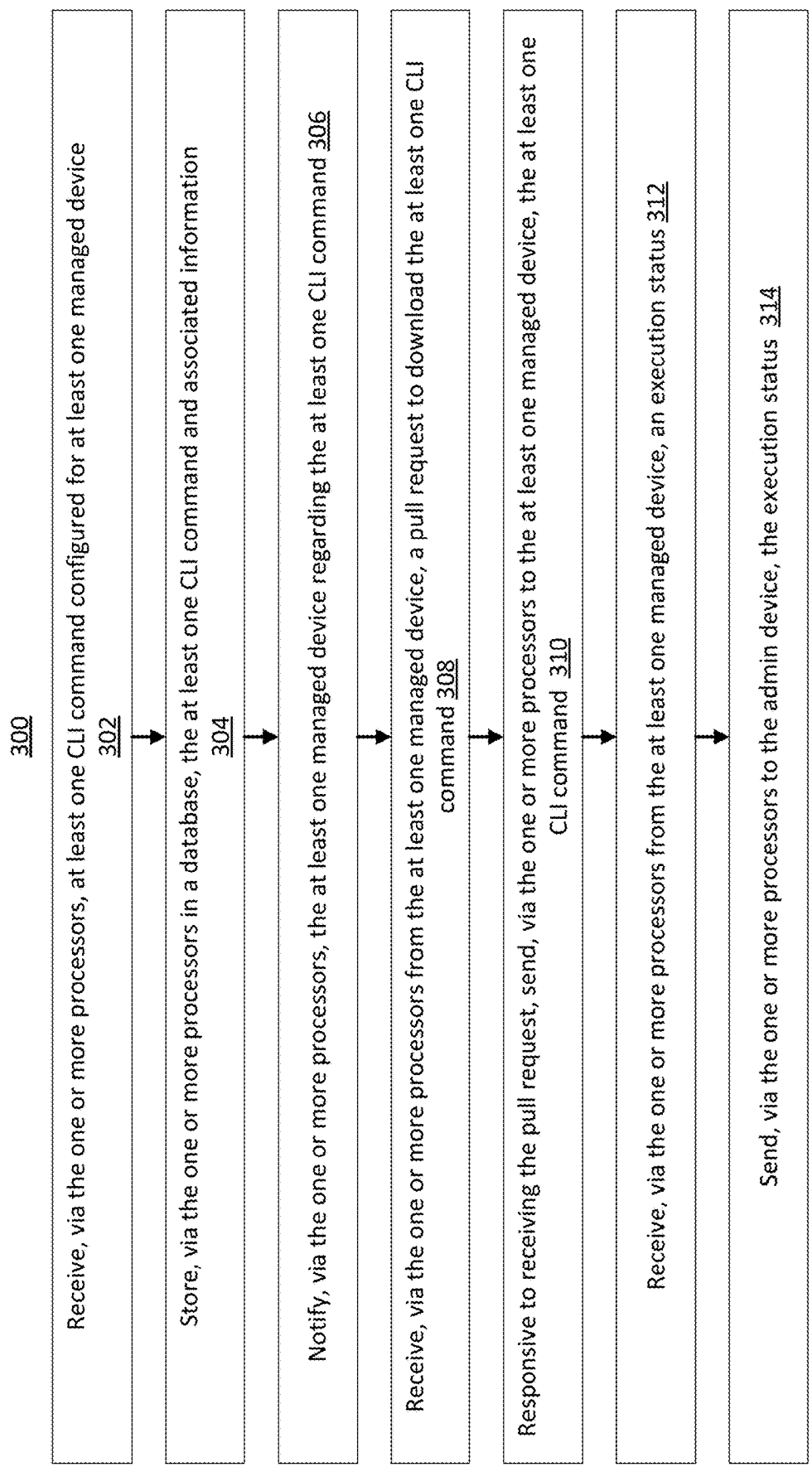
FIG. 3 shows a method for executing a CLI command on at least one managed device, according to an embodiment.

FIG. 3 is a method 300 for executing a CLI command on at least one managed device. The method 300 can be executed by a system such as the system 100 of FIG. 1. The method 300 includes sending, from an admin device to one or more processors, at least one CLI command configured for at least one managed device, at 302; receiving, via the one or more processors, the at least one CLI command, at 304; storing, via the one or more processors in a database, the at least one CLI command and associated information, at 306; notifying, via the one or more processors, the at least one managed device regarding the at least one CLI command, at 308; receiving, via the one or more processors from the at least one managed device, a pull request to download the at least one CLI command, at 310; responsive to receiving the pull request, sending, via the one or more processors to the at least one managed device, the at least one CLI command, at 312; receiving, via the one or more processors from the at least one managed device, an execution status, at 314; and sending, via the one or more processors to the admin device, the execution status, at 316.

At 302, one or more processors (e.g., of a command executing system), receives at least one CLI command. In some implementations, the at least one CLI command can be received from an admin device (e.g., functionally and/or structurally similar to the user compute device 130). The at least one CLI command is configured to be associated with at least one managed device (e.g., functionally and/or structurally similar to the device 140 of FIG. 1). In some implementations, the at least one CLI command can include multiple commands intended for one device. In some implementations, the at least one CLI command can include commands intended for more than one device (e.g., a group of devices). The one or more processors can determine, based on the at least one CLI command, the one or more managed devices that are associated with the at least one CLI command. In some implementations, the determination can be made by looking-up a device ID in a database. In some implementations, the one or more managed devices can be associated with a group ID provided by an administrator (e.g., such as the user U1 of FIG. 2). Group IDs can allow for an administrator to set-up groups of devices. For example the groups of devices can be sorted by device type, user type, physical location, and/or the like.

At 304, the at least one CLI command is stored in a database (e.g., functionally and/or structurally similar to the database 150 of FIG. 1) with associated information (e.g., timestamp, destination device, etc.).

At 306, the one or more processors notify the at least one managed device regarding the at least one configuration change. In some implementations, the at least one managed device is notified via a notification gateway (e.g., functionally and/or structurally similar to the notification gateway 110 of FIG. 1). The at least one managed device can be notified by receiving a notification message. In some implementations, the notification message can include the type of CLI commands included in the at least one CLI command, the size of the at least one CLI command, the priority of the at least one CLI command, and/or the like. The notification message can cause the at least one managed device to add the CLI command to a queue so that the at least one managed device generates a pull request when the at least one managed device has processing capacity. In some implementations, the at least one managed device waits to receive multiple notification messages before generating a pull request. For example, the at least one managed device can wait until a notification message with a high priority is received.

At 308, the one or more processors receives the pull request from the at least one managed device. The pull request including a request to download the at least one CLI command. The pull request can be received via a channel separate from the notification gateway to reduce the likelihood of a bottleneck. In some implementations, the separate channel involves and/or includes a proxy device. In response to receiving the pull request, the one or more processors send the at least one CLI command to the at least one managed device in response to receiving the pull request, at 310. The at least one CLI command can be sent to the at least one managed device via the proxy device. In some implementations, the at least one CLI command is sent to an adapter of the at least one managed device. In some implementations, the adapter converts the at least one CLI command to a device-specific format. Once the at least one managed device executes the at least one CLI command, an execution status can be generated. The execution status can indicate whether the at least one CLI command was executed successfully or if it failed to execute. In some implementations, the execution status can include the execution status of more than one CLI command. In some implementations, the execution status can further include the results of the executed at least one CLI command.

At 312, the one or more processors then receive an execution status from the at least one managed device. In some implementations, the one or more processors can store the execution status in the database. At 314, the one or more processors send the execution status to the admin device. The execution status can then be reviewed by the user.

Referring generally to FIGS. 4-9, various implementations of a CLI command execution system (e.g., functionally and/or structurally similar to the system 10) are shown. The implementations are intended to be examples and additional implementations are also possible.

Figure 4:
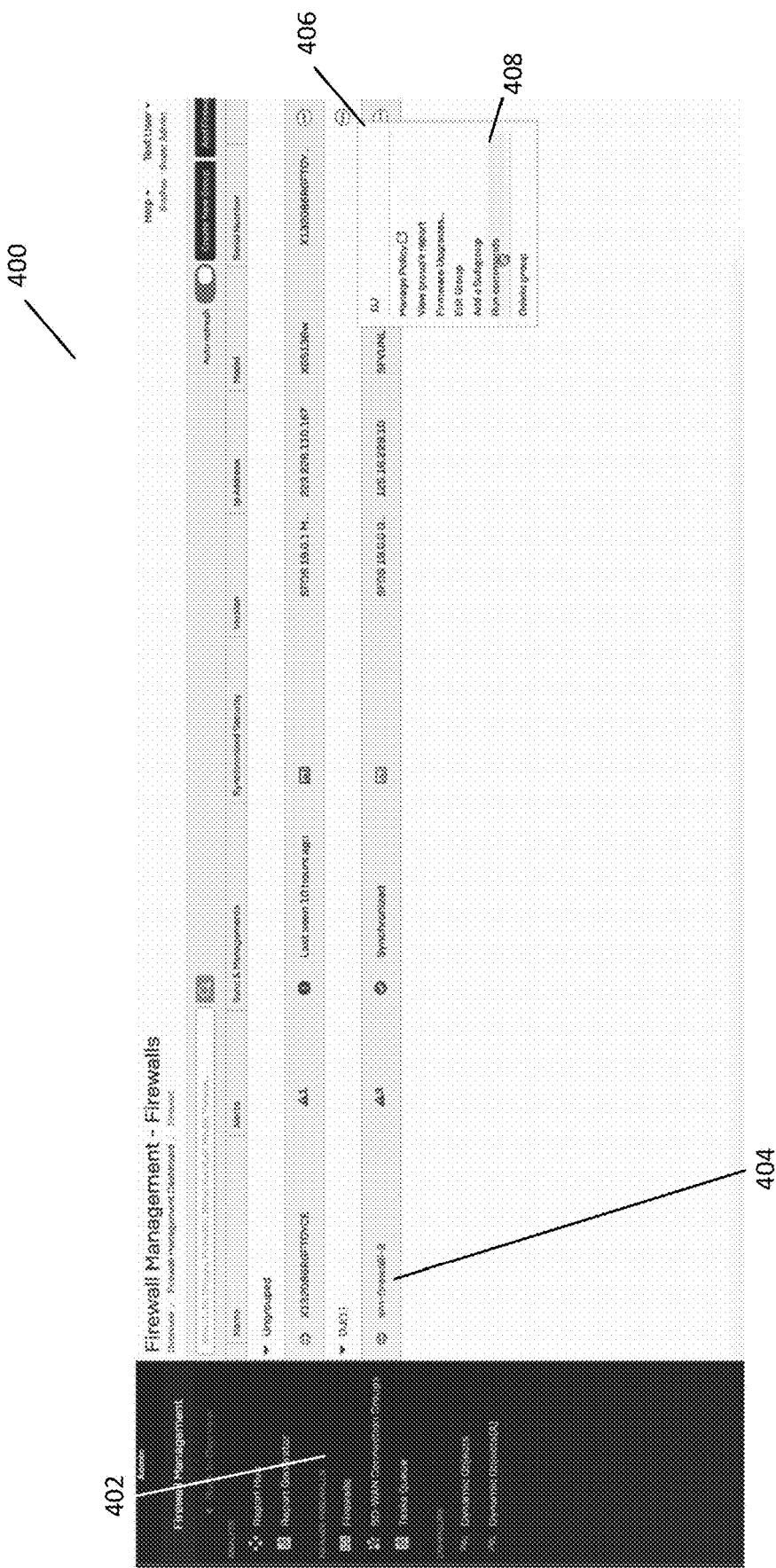
FIG. 4 shows an example device management interface, according to an embodiment.

FIG. 4 shows an example device management interface 400, according to an embodiment. The device management interface 400 can be displayed on a display (e.g., structurally and/or functionally similar to the display 136 of FIG. 1) of a user device (e.g., structurally and/or functionally similar to the user compute device 130 of FIG. 1). The various information displayed on the display can include inputs entered into the user device and/or outputs received from a CLI command executing system (e.g., functionally and/or structurally similar to the command executing system 100 of FIG. 1). The device management interface 400 can be used to manage more than one device (e.g., structurally and/or functionally similar to the device 140 of FIG. 1). In some implementations, a user (e.g., the user U1 of FIG. 1) can interact (e.g., input commands, read displays, etc.) with the device management interface 400. The embodiment of FIG. 4 shows a particular configuration; however, it should be known that other configurations of displaying and interacting with information on a display are also possible.

The device management interface 400 includes a device management menu 402. The device management menu 402 allows for the user to select different devices and/or select different views of the device management interface. For example, the device management menu 402 can include a device-type selection, a device-group selection, a task listing, and/or the like. The embodiment of FIG. 4 displays a device-type selection associated with firewalls. In some implementations, other device-types can be shown. The device management interface 400 displays a device list 404. The device list 404 displays a listing of present devices. In some implementations, the devices can be categorized by some characteristic and/or tag. Each device in the device list 404 includes an associated drop-down menu 406, which can include processes and/or commands related to the functionality of the associated device. The drop-down menu 406 includes a command execution button 408. The command execution button 408 can be used to enter a command for execution on the associated device(s). In some implementations, the command execution button can be used to send a command to a group of managed devices.

Figure 5:
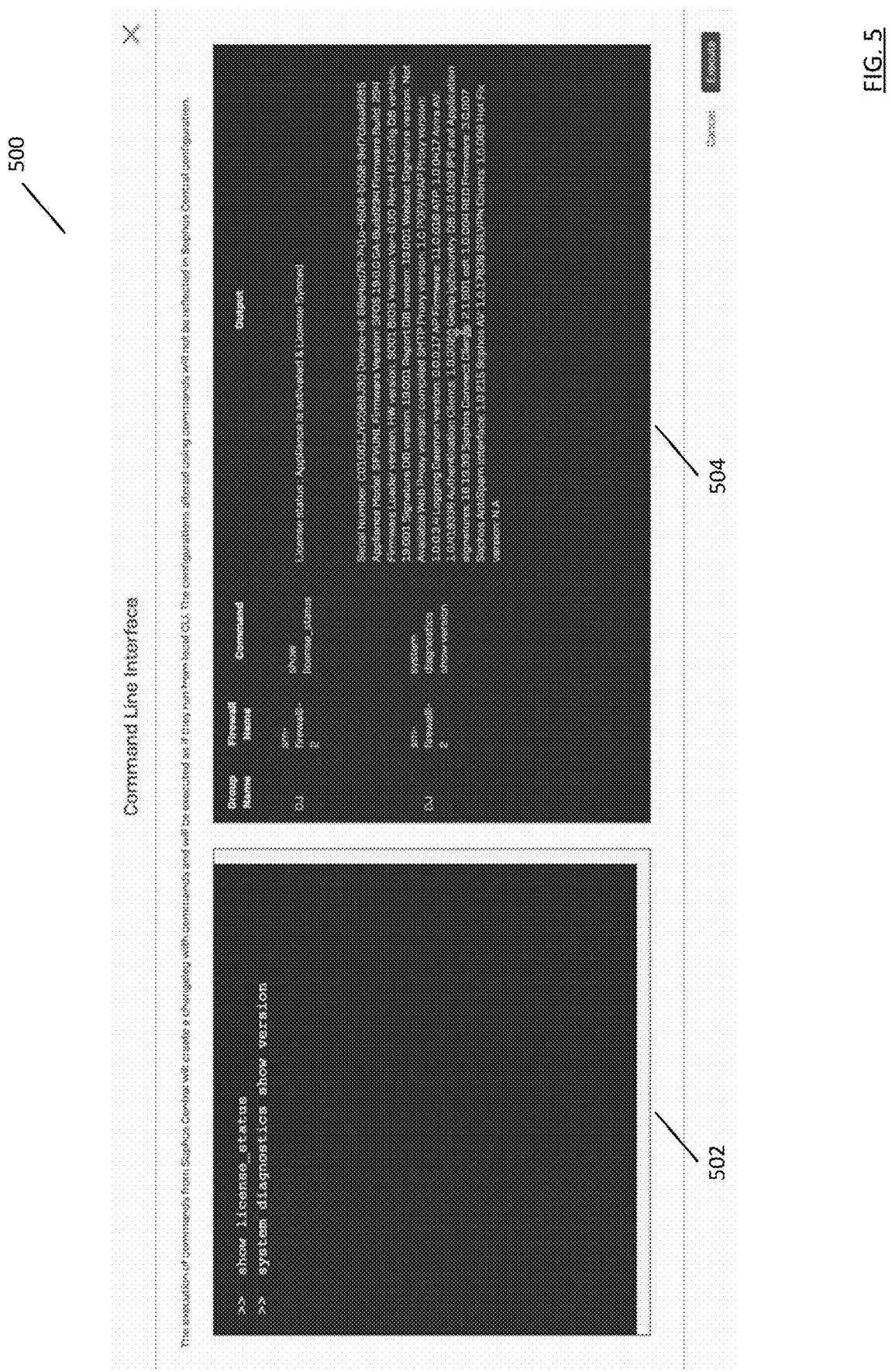
FIG. 5 shows an example command line interface showing a set of commands, according to an embodiment.

FIG. 5 shows an example CLI 500 showing a set of command, according to an embodiment. In some implementations, the CLI 500 can be a window that appears after pressing a command execution button (e.g., structurally and/or functionally similar to the command execution button 408 of FIG. 4) in a device management interface (e.g., structurally and/or functionally similar to the device management interface 400 of FIG. 4). The CLI 500 includes an input window 502 and an output window 504 which displays the results of the commands inputted into the input window 502.

The input window 502 is configured to accept CLI commands. The input window 502 can accept inputs, in the form of CLI commands, from a peripheral (e.g., functionally and/or structurally similar to the peripheral(s) 138 of FIG. 1). Once the CLI command is entered in the input window 502, the input window 502 receives a confirmation input that sends the CLI command for execution. In some implementations, the CLI command execution process can be the same or similar to the workflow 20 of FIG. 2 or as described in method 300 of FIG. 3. In some implementations, multiple CLI commands can be entered into the input window 502 simultaneously and/or sequentially.

The output window 504 displays the results of the CLI commands inputted into the input window 502. The input window 504 includes rows and columns associated with various information associated with executing a CLI command. Each row is associated with a CLI command, where each column is associated with a characteristic associated with the CLI command. For example, as depicted in FIG. 5, the output window 504 includes a column for the name of a device group, a column for the name of the device, a column for the CLI command, and the output. FIG. 5 shows two example inputs in the input window 502 and two associated example outputs in the output window 504.

Figure 6:
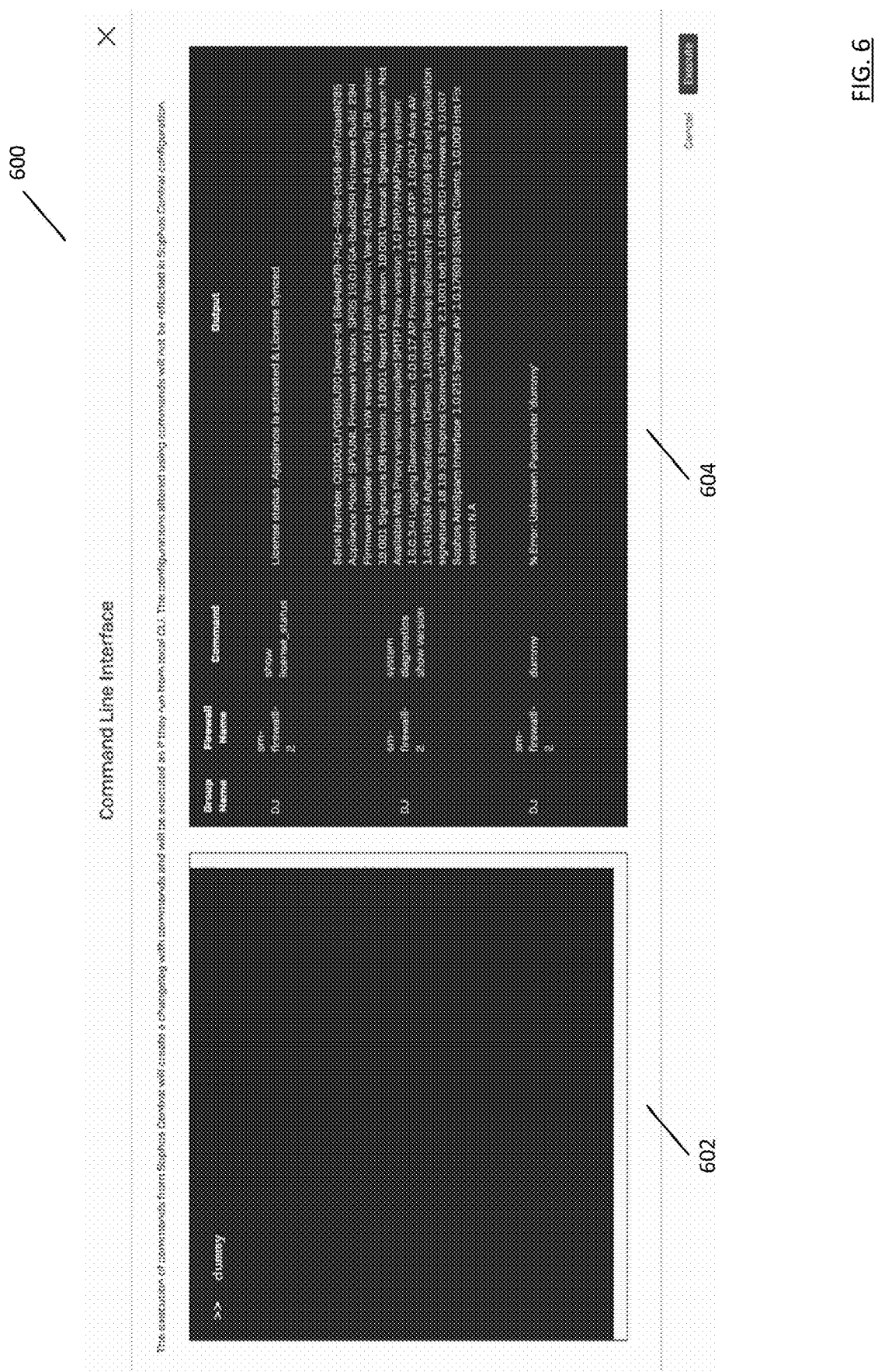
FIG. 6 shows another example command line interface showing a command, according to an embodiment.

FIG. 6 shows another example CLI 600 showing a command, according to an embodiment. The CLI 600 is functionally and/or structurally similar to the CLI 500 of FIG. 5. The CLI 600 includes an input window 602 (e.g., functionally and/or structurally similar to the input window 502 of FIG. 5) and an output window 604 (e.g., functionally and/or structurally similar to the output window 504 of FIG. 5). FIG. 6 includes a dummy command inputted into the input window 602. The dummy command is configured to test if the CLI 600 can reject commands that are not executable CLI commands. The output window 604 shows the result of the dummy command which indicates that the dummy command cannot be executed by the device.

Figure 7A:
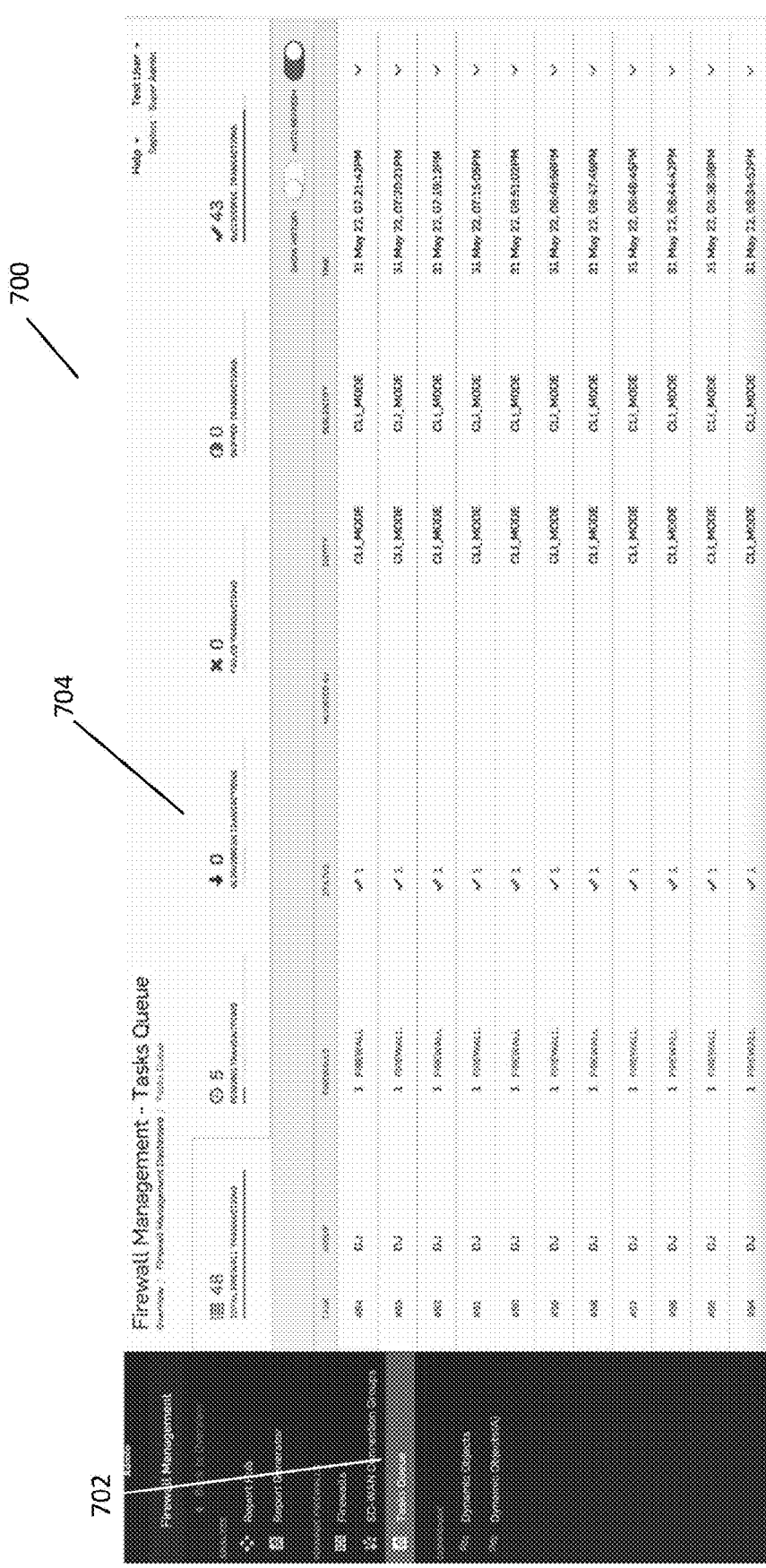
FIG. 7A shows an example of a device management queue, according to an embodiment.
Figure 7B:
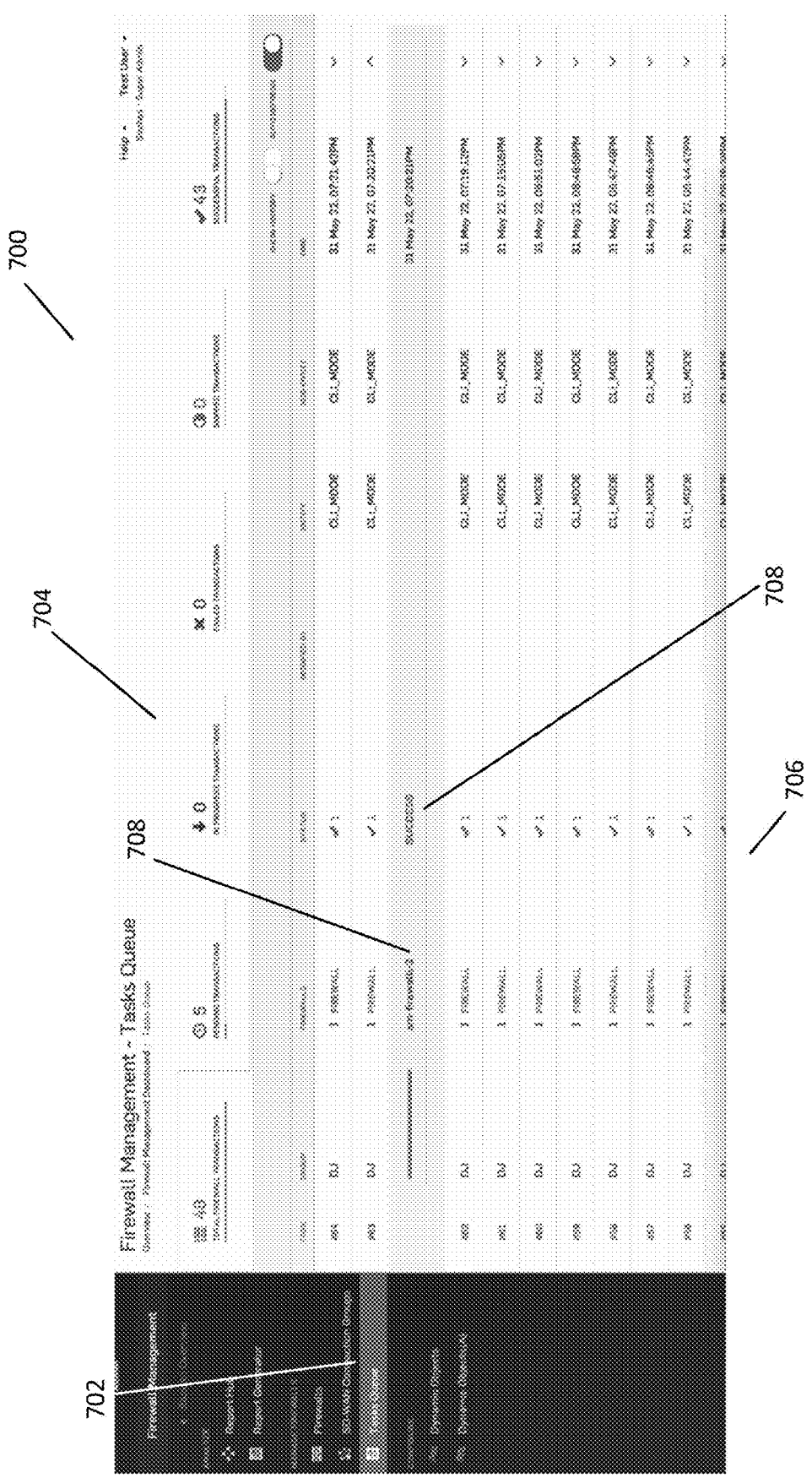
FIG. 7B shows an example of a results interface of the device management queue of FIG. 7A.
Figure 7C:
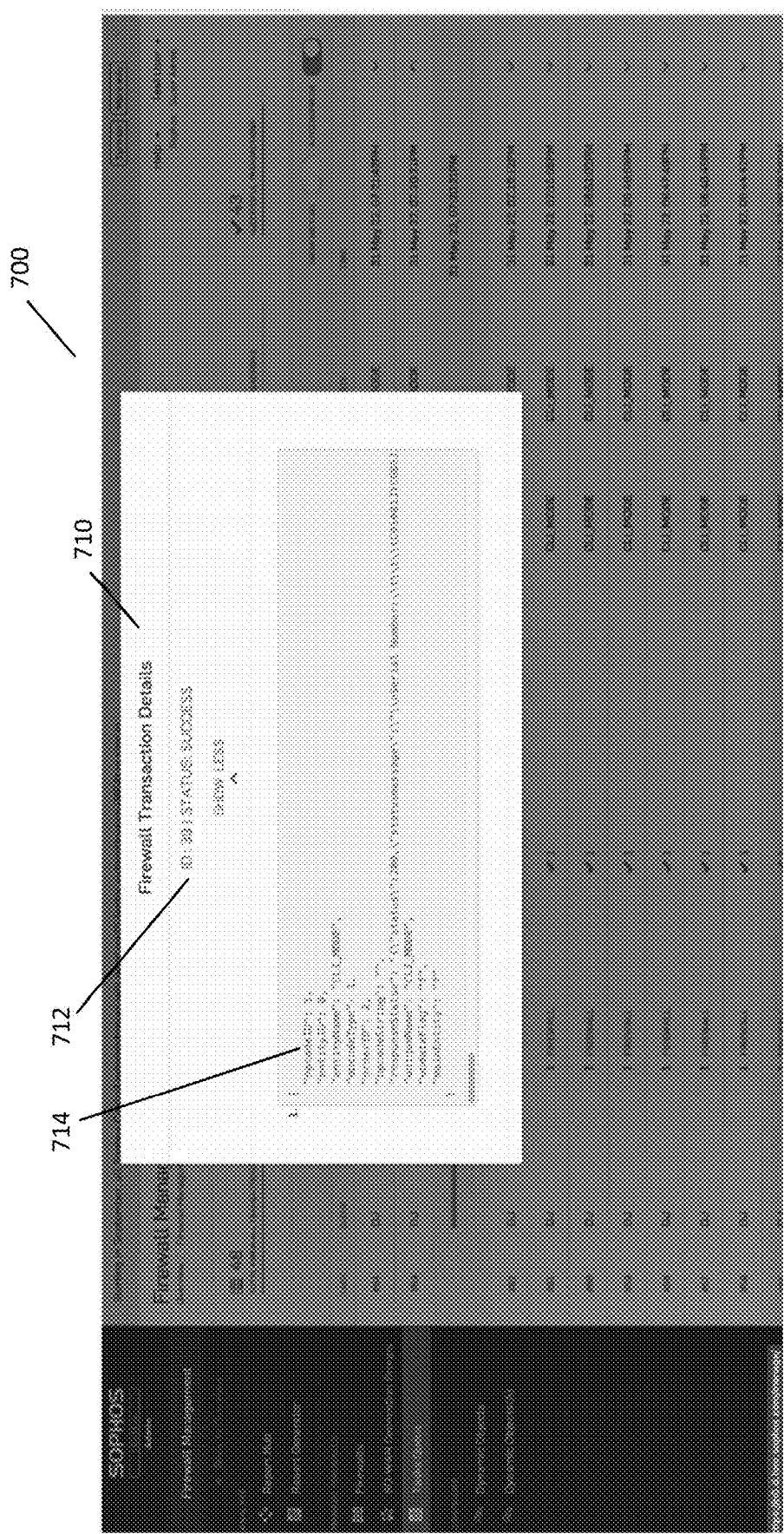
FIG. 7C shows an example of a detail window of the device management queue of FIG. 7A.

Referring generally to FIGS. 7A-7C, a device management queue 700 is shown. The device management queue 700 can be another display of the device management interface 400 of FIG. 4.

FIG. 7A shows an example of the device management queue 700, according to an embodiment. The device management queue 700 is used to review and manage executed by various devices. The device management queue 700 can be accessed by selecting the task queue option in the device management menu 702 (e.g., functionally and/or structurally similar to the device management menu 402 of FIG. 4).

The device management queue 700 includes progress tabs 704. The progress tabs 704 allow for CLI commands with various execution statuses to be viewed together or discreetly. For example, the progress tabs 704 can include a total tab (e.g., which includes the CLI commands that have been executed and to be executed), a pending tab (e.g., which includes CLI commands that have been inputted but not pulled by the device(s)), an in-progress tab (e.g., which includes CLI commands that are being processed by the device(s)), a failed tab (e.g., which includes CLI commands that could not be executed by the device(s)), a skipped tab (e.g., which includes CLI commands that have been omitted and not processed by the device(s)), a success tab (e.g., which includes CLI commands that have been successfully executed by the device(s)), and/or the like.

Each progress tab 704, displays a command listing 706. In some implementations, each item in the command listing 706 can include multiple associated CLI commands and/or a single associated CLI command. The command listing can include rows, which are associated with one or a group of CLI commands, and columns, which are associated with characteristics associated with the one or a group of CLI commands. The characteristics can include, a task number, the device group, the device type, the status, modification information, an entity code, a sub-entity code, a time associated with the one or a group of CLI commands, and/or the like.

As seen in FIG. 7B, the items in the command listing 706 can be expanded to show additional information 708 such as a device name, status link 708, and the like. The status link 708 can be selected to open an execution window 710, shown in FIG. 7C. The execution window 710 includes information and results of executing a CLI command. The execution window 710 includes a status identifier 712 indicating the status of the CLI command (e.g., success, fail, pending, etc.). The results of the CLI command, as well as any other outputs (e.g., error notifications, progress updates, etc.), are displayed in a display window 714.

FIGS. 8 and 9 show an example of the results of executed CLI commands, according to an embodiment. The CLI commands of FIGS. 8 and 9 can be results of the workflow 20 and/or using the system 10 to generate executed CLI commands on managed devices. The CLI command results of FIG. 8 show the results of checking the license status of a device, showing advanced firewall settings, running a disk diagnostic, running a memory diagnostic, and showing an uptime of the system. The CLI command results of FIG. 9 show the results of displaying a server address, displaying a list of users, displaying configurations of the system, displaying interfaces, and partition information. In some implementations, other CLI commands can be entered.

In some embodiments, an apparatus includes one or more memories and one or more processors operatively coupled to the one or more memories. The one or more processors are configured to receive at least one command line interface command, generate a push notification associated with the at least one command line interface command, send the push notification to at least one managed device, and, responsive to the at least one managed device receiving the push notification, receive a pull request from the at least one managed device. The one or more processors are further configured to, responsive to receiving the pull request, send the at least one command line interface command to a device-specific adaptor of the at least one managed device such that the device-specific adaptor converts the at least one command line interface command to a device-specific command associated with the at least one managed device, and receive an execution status from the at least one managed device in response to the device-specific command being executed by the at least one managed device.

In some implementations, the at least one managed device includes at least one of a network switch, a firewall, or a network access point.

In some implementations, the one or more processors are further configured to store the at least one command line interface command in a database.

In some implementations, the one or more processors are further configured to send the execution status to a user device, responsive to receiving the execution status.

In some implementations, the one or more processors are further configured to format the at least one command line interface command using an adapter to define a device-specific command line interface command, the processor configured to send the formatted command line interface command to the at least one managed device.

In some implementations, the execution status is associated with more than one device-specific command.

In some implementations, the one or more processors are further configured to store information associated with the at least one managed device and received in response to the at least one command line interface command being executed by the at least one managed device. In some implementations, the at least one managed device is a network device.

In some embodiments, an apparatus includes one or more memories and one or more processors operatively coupled to the one or more memories. The one or more processors are configured to receive at least one command line interface command, generate a push notification associated with the at least one command line interface command, send the push notification to at least one managed device, and responsive to the at least one managed device receiving the push notification, receive a pull request from the at least one managed device. The one or more processors are further configured to, responsive to receiving the pull request, send the at least one command line interface command to a device-specific adaptor of the at least one managed device such that the device-specific adaptor converts the at least one command line interface command to a device-specific command associated with the at least one managed device, and receive an execution status from the at least one managed device in response to the device-specific command being executed by the at least one managed device.

In some implementations, the at least one command line interface command is a configuration change.

In some implementations, the at least one command line interface command is a status check.

In some implementations, the instructions further comprise code to cause the one or more processors to send, to a command line interface, the execution status such that the command line interface presents the execution status.

In some implementations, the notification is sent via a WebSocket connection open by the plurality of managed devices and the first pull request and the second pull request are received via a proxy device.

In some implementations, the at least one command line interface command is sent to the first managed device and the second managed device via the proxy device.

In some implementations, the execution status is associated with a plurality of executed device-specific commands.

In some embodiments, an apparatus includes one or more memories and one or more processors operatively coupled to the one or more memories. The one or more processors are configured to receive a notification regarding at least one command line interface command and send a pull request. The pull request includes a request to download the at least one command line interface command. The one or more processors are configured to receive the at least one command line interface command, convert the at least one command line interface command to a device-specific command, and execute the device-specific command.

In some implementations, the notification is received via a WebSocket connection between at least one managed device and a notification gateway.

In some implementations, the pull request is sent to a proxy device by an adapter.

In some implementations, the one or more processors are further configured to send an execution status associated with the executed device-specific command.

In some implementations, the execution status is sent responsive to multiple device-specific commands being executed.

It should be understood that the disclosed embodiments are not intended to be exhaustive, and functional, logical, operational, organizational, structural and/or topological modifications can be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
   one or more memories; and
   one or more processors operatively coupled to the one or more memories, the one or more processors configured to:
   receive at least one command line interface command;
   generate a push notification associated with the at least one command line interface command;
   determine a capacity associated with a first channel;
   responsive to the capacity being below a capacity threshold, send, via the first channel, the push notification to at least one managed device;
   responsive to the capacity exceeding the capacity threshold, send, via a second channel different from the first channel, the push notification to the at least one managed device;
   responsive to the at least one managed device receiving the push notification, receive, via the second channel a pull request from the at least one managed device;

responsive to receiving the pull request, send the at least one command line interface command to a device-specific adaptor of the at least one managed device such that the device-specific adaptor converts the at least one command line interface command to a device-specific command associated with the at least one managed device; and receive an execution status from the at least one managed device in response to the device-specific command being executed by the at least one managed device.

2. The apparatus of claim 1, wherein the at least one managed device includes at least one of a network switch, a firewall, or a network access point.

3. The apparatus of claim 1, wherein the one or more processors are further configured to:

store the at least one command line interface command in a database.

4. The apparatus of claim 1, wherein the one or more processors are further configured to:

send the execution status to a user device, responsive to receiving the execution status.

5. The apparatus of claim 1, wherein the one or more processors are further configured to:

format the at least one command line interface command using a formatting layer to define a device-specific command line interface command, and send the device-specific command line interface command to the at least one managed device.

6. The apparatus of claim 1, wherein the execution status is associated with more than one device-specific command.

7. The apparatus of claim 1, wherein the one or more processors are further configured to:

store information associated with the at least one managed device and received in response to the at least one command line interface command being executed by the at least one managed device.

8. The apparatus of claim 1, wherein the at least one managed device is a network device.

9. The apparatus of claim 1, wherein the push notification includes a size constraint.

10. A non-transitory processor-readable medium storing code representing instructions to be executed by one or more processors, the instructions comprising code to cause the one or more processors to:

receive at least one command line interface command;
determine a capacity associated with a first channel;
responsive to the capacity being below a capacity threshold, send, via the first channel, a notification to a plurality of managed devices, the notification associated with the at least one command line interface command;
responsive to the capacity exceeding the capacity threshold, send, via a second channel different from the first channel, the notification to the plurality of managed devices;
receive, in response to the notification, a first pull request from a first managed device from the plurality of managed devices via a third channel, the first pull request associated with the at least one command line interface command;
send the at least one command line interface command to a device-specific adaptor of the first managed device such that the device-specific adaptor of the first managed device converts the at least one command line interface command to a first device-specific command;

receive, in response to the notification, a second pull request from a second managed device from the plurality of managed devices, the second pull request associated with the at least one command line interface command;
send the at least one command line interface command to a device-specific adaptor of the second managed device such that the device-specific adaptor of the second managed device converts the at least one command line interface command to a second device-specific command; and
receive an execution status from at least one of the first managed device or the second managed device in response to the first device-specific command being executed by the first managed device or the second device-specific command being executed by the second managed device.

11. The non-transitory processor-readable medium of claim 10, wherein the at least one command line interface command is a configuration change.

12. The non-transitory processor-readable medium of claim 10, wherein the at least one command line interface command is a status check.

13. The non-transitory processor-readable medium of claim 10, wherein the instructions further comprise code to cause the one or more processors to:

send, to a command line interface, the execution status such that the command line interface presents the execution status.

14. The non-transitory processor-readable medium of claim 10, wherein:

the notification is sent via a WebSocket connection open by the plurality of managed devices; and
the first pull request and the second pull request are received via a proxy device.

15. The non-transitory processor-readable medium of claim 14, wherein the at least one command line interface command is sent to the first managed device and the second managed device via the proxy device.

16. The non-transitory processor-readable medium of claim 10, wherein the execution status is associated with a plurality of executed device-specific commands.

17. The non-transitory processor-readable medium of claim 10, wherein the third channel is the first channel or the second channel.

18. An apparatus comprising:
one or more memories; and
one or more processors operatively coupled to the one or more memories, the one or more processors configured to:
in response to a capacity associated with a first channel being below a capacity threshold, receive, from the first channel, a notification regarding at least one command line interface command;
in response to the capacity exceeding the capacity threshold, receive, from a second channel, the notification regarding at least one command line interface command;
send, to a third channel, a pull request, the pull request including a request to download the at least one command line interface command;
receive the at least one command line interface command;
convert the at least one command line interface command to a device-specific command; and
execute the device-specific command.

19. The apparatus of claim 18, wherein the notification is received via a WebSocket connection between at least one managed device and a notification gateway.

20. The apparatus of claim 18, wherein the pull request is sent to a proxy device by an adapter.

21. The apparatus of claim 18, wherein the one or more processors are further configured to:
   send an execution status associated with the executed device-specific command.

22. The apparatus of claim 21, wherein the execution status is sent responsive to multiple device-specific commands being executed.

23. The apparatus of claim 1, wherein the second channel is an overflow channel for the first channel if the first channel is above a capacity threshold.

24. The apparatus of claim 1, wherein the push notification includes at least one of an indication of an available command line interface command, a size of the available command line interface command, or an urgency status.

25. The apparatus of claim 24, wherein the one or more processors are further configured to:
   store the push notification based on at least one of the size of the available command line interface command, an available processing power, or the urgency status.

26. The apparatus of claim 18, wherein the third channel is the first channel or the second channel.

\* \* \* \* \*